INVENTOR
GEORGE J. LAURENT
ATTORNEYS

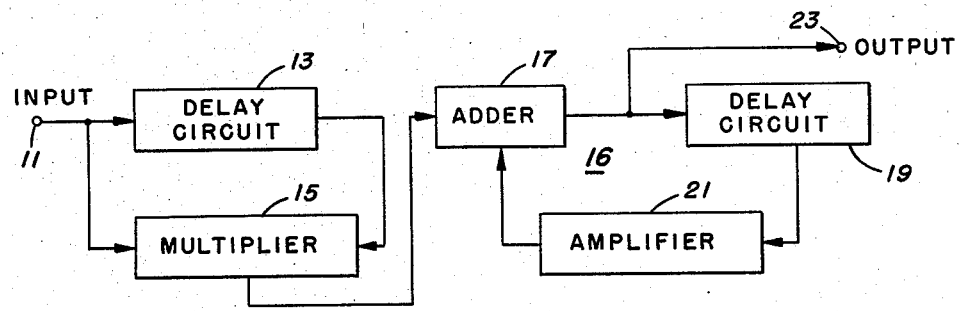
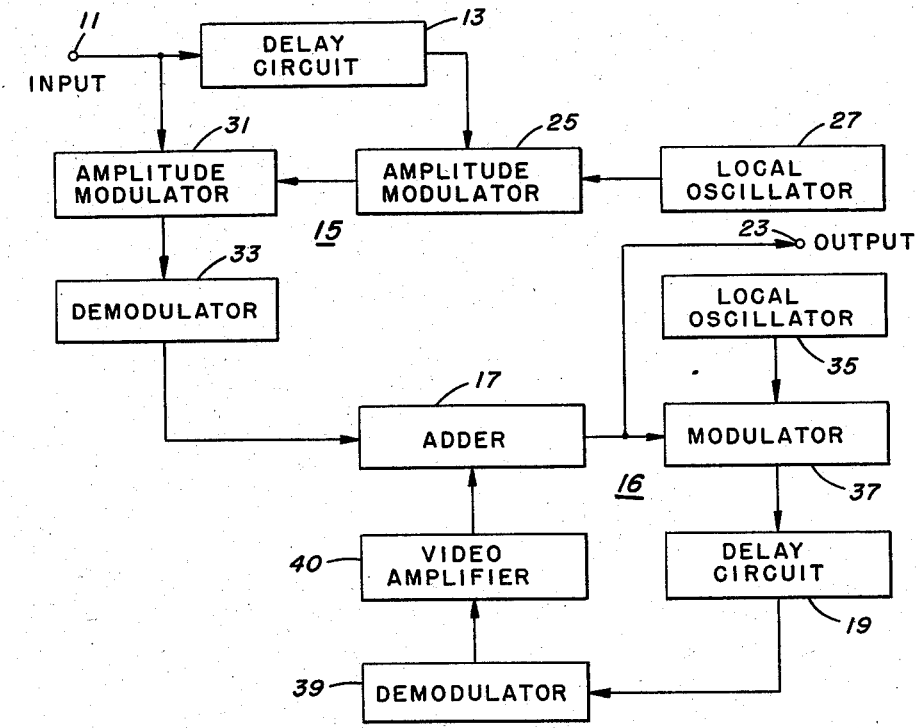

United States Patent Office 2,908,812
Patented Oct. 13, 1959

2,908,812

PULSE-TO-PULSE NON-LINEAR FILTERS

George J. Laurent, Jenkintown, Pa., assignor, by mesne assignments, to the United States of America as represented by the Secretary of the Navy Application November 9, 1955, Serial No. 546,016

4 Claims. (Cl. 250—20)

The present invention relates to pulse-to-pulse non-linear filters and more particularly to pulse-to-pulse non-linear filters employing memory of one interpulse period of a radar receiver or the like.

In radar return there are at least four basic differences between noise and the desired signal. These differences are:

(1) The average value of N (where N is any number) signal plus noise variates is greater than that of N noise variates; the term "variate" being synonymous with "amplitude of return signal."

(2) The average value of N signal plus sea return variates is greater than that of N sea return variates where the sea return variates are chosen in the general region of the target signal, i.e. close by in range and azimuth.

(3) The pulse-to-pulse correlation of N signal plus noise variates is larger than that of N noise variates (which have no pulse-to-pulse correlation).

(4) The pulse-to-pulse correlation of N signal plus sea return variates is larger than that of N sea return variates alone as subject to the location constraints given in 2 above.

The present invention is concerned with forms of filters employing non-linear combinations of pulse-to-pulse radar return providing enhancement of target to interference by exploiting all four differences outlined above.

Accordingly an object of the present invention is the provision of devices for improving signal-to-noise ratio.

Another object is to provide pulse-to-pulse non-linear filters for improving signal-to-noise ratio.

A further object of the invention is the provision of pulse-to-pulse non-linear filters for improving signal-to-noise ratio through utilization of differences between the average value and pulse-to-pulse correlation of radar returns containing signal plus noise and of radar returns including noise alone.

Other objects and many of the attendant advantages of this invention will be readily appreciated as the same becomes better understood by reference to the following detailed description when considered in connection with the accompanying drawings wherein:

Fig. 1 shows a block diagram of one embodiment of this invention.

Fig. 2 illustrates a detailed block diagram of a circuit for performing the operations of the components of Fig. 1.

Figure 3:
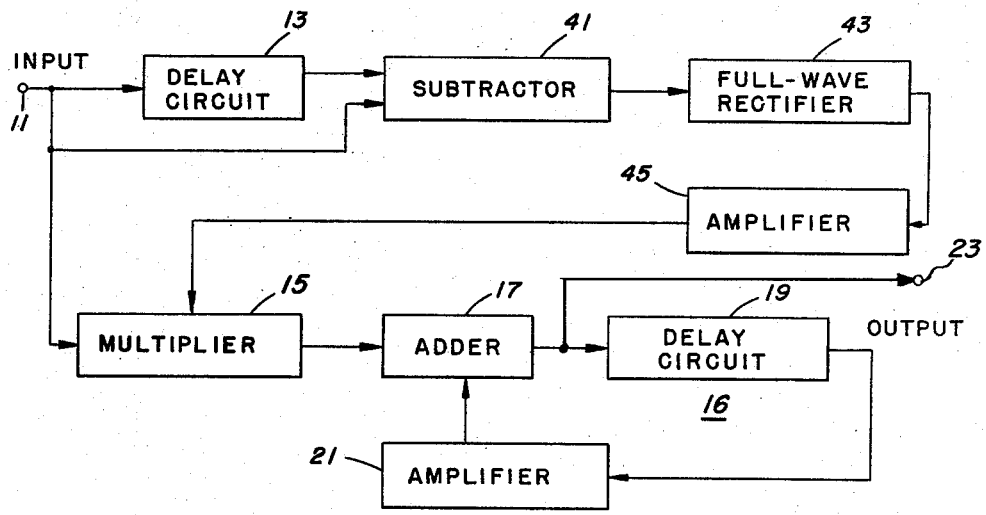
Fig. 3 shows a block diagram of another embodiment of this invention.

Referring now to the drawings, wherein like reference characters designate like or corresponding parts, there is shown in Fig. 1 an input terminal 11 which is normally connected to receive the incoming radar return signal from a radar receiver, when the invention is employed in a radar unit. This incoming radar return signal is fed to delay circuit 13 which delays the signal before transferring it to one input of multiplier 15. The incoming radar return signal is also conducted directly to the other input of multiplier 15. The output product signal is coupled to a sweep integrator circuit 16 comprising an adder circuit 17, a delay circuit 19, and an amplifier 21. Adder 17 has two inputs; one from multiplier 15 and the other from the feedback circuit which includes delay circuit 19 and amplifier 21. Terminal 23 is connected to the output of adder 17 and is the output terminal for this filter circuit.

Although all of the block components of Fig. 1 refer to well known circuits, a more detailed showing of the multiplier and sweep integrator circuits in combination with the other circuit components is presented in Fig. 2 for exemplary purposes. As shown in Fig. 2, multiplier 15 comprises amplitude modulator 25, local oscillator 27, amplitude modulator 31 and demodulator 33, while sweep integrator circuit 16 comprises adder 17, local oscillator 35, modulator 37, delay circuit 19, demodulator 39, and video amplifier 40. The input terminal 11 is connected to delay circuit 13 which along with delay circuit 19 may be of nearly any type; e.g. an acoustic delay line employing a solid or liquid medium would be suitable. The output of delay circuit 13 is coupled to amplitude modulator 25 wherein the delayed signal is modulated on a carrier provided by local oscillator 27. The output from modulator 25 and the received radar signal from terminal 11 are conducted to amplitude modulator 31 and thence to demodulator 33. The demodulated signal is supplied to one input of adder circuit 17 which may be a conventional linear voltage adder circuit such as have been used for a long time in audio systems. However, the frequency range of the adder system should be sufficient to accommodate the video pulses which are supplied thereto. In a typical case, the adder circuit may comprise two voltage amplifier stages having a common anode load impedance. The control grid of one amplifier stage would be energized by the signal from the multiplier and the control grid of the other amplifier stage would be energized by the signal from the video amplifier in the sweep integrator. A second form of adder circuit may comprise a single amplifier stage having a resistance network in the grid circuit for combining the two signals. The other input to adder circuit 17 is fed by a feedback circuit comprising local oscillator 35, modulator 37, delay circuit 19, demodulator 39, and amplifier 40. Output terminal 23 is joined to the output of adder 17.

Another embodiment of this invention is shown in Fig. 3 wherein input terminal 11 is joined to subtractor circuit 41 directly and also indirectly through delay circuit 13. The output of subtractor circuit 41 is rectified by full-wave rectifier 43, amplified by amplifier 45 and then fed to one input of multiplier 15. Input terminal 11 is also joined to the other input of multiplier 15. The output of multiplier 15 is connected to sweep integrator circuit 16. Multiplier 15 and sweep integrator circuit 16 have been previously described in the discussion of the embodiment of Fig. 1.

Figure 4:
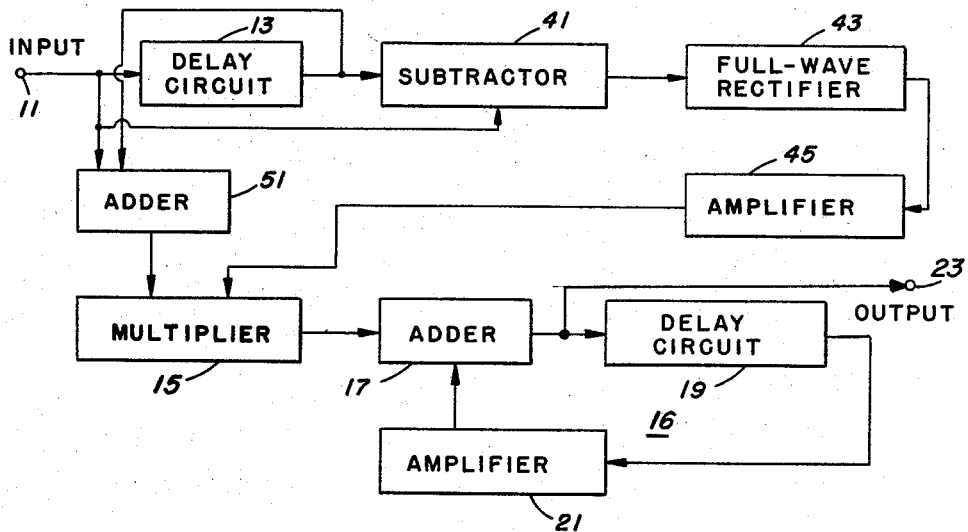
Fig. 4 illustrates still another embodiment of this invention.

The embodiment of Fig. 4 is identical to that of Fig. 3 with the exception of adder 51 which is placed between the input terminal 11 and multiplier 15. The output of delay circuit 13 is also fed to one of the inputs of adder 51. The block diagram components of this circuit, as well as the circuits of Figs. 1 to 3, designate circuits that are well known in the art and for which there are many suitable variations or equivalents.

In the embodiment of Fig. 1, the input from terminal 11 to multiplier 15 at any time $t$ is $x_t$. The other input from delay circuit 13 is $x_{t-T}$, where T is the delay of circuit 13 and is also the interpulse time of the radar set or the like. Multiplier 15 combines these two signals to provide the signal $x_t \cdot x_{t-T}$. This signal is supplied to the input of adder 17 of sweep integrator 16. Since the delay around the sweep integrator loop is exactly equal to T, at time $t$ there will be applied to the adder 17 from amplifier 21 the signal which was applied to the input at time $t-T$, now delayed by one trip around the amplifier loop, and also the signal which was supplied at time $t-2T$ now delayed by two trips around the integrator loop, etc. The signal supplied to the input of adder 17 one interpulse period earlier is $x_{t-T}$ (which was supplied to the left hand input of the multiplier) times $x_{t-2T}$ (which was supplied to the right hand input of the multiplier). In passing around the integrator loop once, this signal has been amplified by the factor K which is the total loop gain. In a typical sweep integrator, K has a value in the range 0.8 to 0.98. Therefore, the second term of the signal at adder 17 at time $t$ becomes $K \cdot x_{t-T} \cdot x_{t-2T}$. The signal supplied from the multiplier 15 to adder 17 at time $t-2T$ is amplified by the factor K on the first trip around the loop and is again amplified by the factor K on the second trip around the loop for a total amplification of $K^2$. Thus the output at terminal 23 is equal to $x_t \cdot x_{t-T} + K x_{t-T} \cdot x_{t-2T} + K^2 x_{t-2T} \cdot x_{t-3T} + $ etc. which is seen to be the pulse-to-pulse auto correlation for a lag of one interpulse period but with exponential memory. This filter provides a gradual "roll off characteristic" producing less response to signals which have less and less pulse-to-pulse correlation.

In Fig. 2 a constant amplitude carrier wave generated by the local oscillator source 27 is supplied to the amplitude modulator 25. The output of delay circuit 13 modulates this constant amplitude carrier wave to provide an output signal which is a carrier wave having an amplitude proportional to the amplitude of the output from delay circuit 13. This modulated carrier wave is supplied to the second amplitude modulator 31 where it is again amplitude-modulated by the signal supplied at terminal 11. Therefore the output of amplitude modulator 31 is a carrier signal having an amplitude proportional to the product of the radar return signal and the signal at the output of delay circuit 13. Demodulator 33 demodulates this signal and thereby produces a video signal which is proportional to the product of the incoming radar return and the signal at the output of the delay circuit 13. The demodulated signal is conducted to adder 17 which sums the demodulated signal plus a feedback signal. Usually it is more efficient to pass amplitude-modulated carrier signals through an acoustic delay line rather than passing video signals. Therefore a modulator circuit 37 and local oscillator 35 are provided for converting the video signals in the output of the adder 17 into bursts of signals in the megacycle range which will pass through the delay circuit 19 with a minimum of attenuation. The delayed bursts of carrier signals at the output of delay circuit 19 are reconverted to video signals by the demodulator 39. The video signals in the output of demodulator 39 are passed through a video amplifier 40 having a gain which is carefully controlled so that the total amplification around the loop is slightly less than unity. While only a single amplifier has been shown, it is sometimes convenient to place an amplifier between the modulator and the delay line and between the delay line and the demodulator. If this is done, the total amplification around the loop should be such that the total gain of the loop is still slightly less than unity, for example approximately 0.9. A gain of less than unity in the sweep integrator loop will cause the stored signals to decay exponentially and to become ineffective after a number of passages through the loop equal to approximately $1/1-K$, where K is the overall gain of the series loop.

In the embodiment of Fig. 3, subtractor 41 provides an output which is a measure of the change in signal level between successive radar returns that are fed to subtractor 41 directly from terminal 11 and indirectly after a delay equal to the interpulse time through delay circuit 13. Full wave rectifier 43 rectifies this difference signal and produces an output that is equal to the magnitude of the difference between adjacent radar returns without regard to the sign of the difference between these adjacent returns. This difference signal is employed by multiplier 15 to "weight" in amplitude the amount of the incoming signal which is permitted to go into the averager, shown here as a sweep integrator of exponential memory. As shown, the difference signal is made uni-polar and used to reduce the amplitude of the signal to be admitted to sweep integrator 16. The output signal from multiplier 15 at time $t$ is thus proportional to $(X_t)(X_t - X_{t-T})$. Accordingly, using a method of analysis similar to that employed above in the description of Fig. 1, the output signal at terminal 23 is proportional to $$(X_t)(X_t - X_{t-T}) + K(X_{t-T})(X_{t-T} - X_{t-2T})$$
$$+ K^2(X_{t-2T} - X_{t-3T}) + \text{etc.}$$

The circuit is capable of great discrimination against successive signals of differing amplitudes.

As previously stated, the embodiment of Fig. 4 is identical to that of Fig. 3 with the exception of the additional adder 51 of Fig. 4. Since the output of subtractor 41 is the difference between two successive radar returns, it is as much the function of the amplitude of one return as it is of the amplitude of the other return. Therefore there is no more reason for multiplying one return by this difference than there is of multiplying the other return by the difference. Therefore, it is advantageous that the difference signal from subtractor 41 multiply the sum of the two returns, obtained from adder 51, which resulted in the difference. In Fig. 4, the output signal at terminal 23 is proportional to $$(X_t + X_{t-T})(X_t - X_{t-T}) + K(X_{t-T} + X_{t-2T})(X_{t-T}$$
$$- X_{t-2T}) + K^2(X_{t-2T} + X_{t-3T})(X_{t-2T} - X_{t-3T}) + \text{etc.}$$

Obviously many modifications and variations of the present invention are possible in the light of the above teachings. It is therefore to be understood that within the scope of the appended claims the invention may be practiced otherwise than as specifically described.

What is claimed is:

1. A filter for improving signal-to-noise ratio for a received radar return comprising: an input terminal for receiving the radar return, subtractor means for producing a uni-polar difference signal of the change in signal level between successive radar returns, an averaging circuit, means for employing said difference signal to control the amplitude of the portion of the radar return from said input terminal which is permitted to go into said averaging circuit, and an output terminal connected to the output of said averaging circuit.

2. The filter of claim 1 wherein said averaging circuit is a sweep integrator of exponential memory.

3. A filter for improving signal to noise ratio comprising: an input terminal adapted to be connected to a radar receiver, delay means connected to said input terminal for producing a delay equal to the radar interpulse period, subtractor means connected to said input terminal means and to said delay means, multiplier means connected to said subtractor means and to said input terminal means, integrating means connected to said multiplier means, and output terminal means connected to said integrating means.

4. The filter of claim 3 including adding means connected to said input terminal means and to said delay means, said multiplier means being connected to said adding means and to said subtractor means.

References Cited in the file of this patent

UNITED STATES PATENTS 2,426,187  Earp _____ Aug. 26, 1947

(Other references on following page)

UNITED STATES PATENTS

| | | |
|---|---|---|
| 2,487,995 | Tucker | Nov. 15, 1949 |
| 2,489,297 | Labin | Nov. 29, 1949 |
| 2,532,546 | Forbes | Dec. 5, 1950 |
| 2,580,148 | Winkler | Dec. 23, 1951 |
| 2,601,289 | Hollobaugh | June 24, 1952 |
| 2,710,943 | Doelz | June 14, 1955 |
| 2,714,205 | Grayson | July 26, 1955 |
| 2,788,450 | Sunstein | Apr. 9, 1957 |
| 2,800,654 | De Rosa | July 23, 1957 |